(12) United States Patent
Naumann et al.

(10) Patent No.: US 8,085,527 B2
(45) Date of Patent: Dec. 27, 2011

(54) PLUG-IN HOUSING MODULE

(75) Inventors: Reiner Naumann, Mannheim (DE);
Gerhard Schwarz, Schönbrunn (DE);
Markus Reinhart, Hassmersheim (DE)

(73) Assignee: Cooper Crouse-Hinds GmbH, Soest (DE)

( * ) Notice: Subject to any disclaimer, the term of this patent is extended or adjusted under 35 U.S.C. 154(b) by 95 days.

(21) Appl. No.: 12/513,982

(22) PCT Filed: Aug. 30, 2007

(86) PCT No.: PCT/EP2007/007596
§ 371 (c)(1),
(2), (4) Date: Sep. 11, 2009

(87) PCT Pub. No.: WO2008/055558
PCT Pub. Date: May 15, 2008

(65) Prior Publication Data
US 2009/0323255 A1    Dec. 31, 2009

(30) Foreign Application Priority Data

Nov. 8, 2006 (DE) .......................... 10 2006 052 717

(51) Int. Cl.
*H02B 11/133* (2006.01)
(52) U.S. Cl. ........ 361/609; 361/608; 361/614; 361/615; 200/50.21; 200/50.24; 439/186
(58) Field of Classification Search .......... 361/608–609, 361/611, 614–616; 200/50.21, 50.24–50.25; 439/181, 186
See application file for complete search history.

(56) References Cited

U.S. PATENT DOCUMENTS

| 1,783,062 A | * | 11/1930 | Trencham ...................... 439/186 |
| 4,214,291 A | * | 7/1980 | Koshman et al. ............. 361/608 |
| 4,796,159 A | * | 1/1989 | Miksche ....................... 361/832 |
| 4,831,489 A |   | 5/1989 | Ozu et al. |
| 5,036,427 A | * | 7/1991 | Krom et al. ................... 361/609 |
| 5,721,406 A | * | 2/1998 | Book et al. ................. 200/50.24 |

FOREIGN PATENT DOCUMENTS

| DE | 3917089 C1 | | 6/1990 |
| EP | 0253758 A1 | | 1/1988 |
| EP | 253758 A1 | * | 1/1988 |
| WO | WO 91/03088 | | 3/1991 |

OTHER PUBLICATIONS

International Search Report (Application No. PCT/EP2007/007596); mailed Nov. 27, 2007; 3 pages.

* cited by examiner

*Primary Examiner* — Robert J Hoffberg
(74) *Attorney, Agent, or Firm* — Fish & Richardson P.C.

(57) ABSTRACT

A plug-in housing module for forming an-explosion-proof switchgear/distribution panel including a number of plug-in points, where when the plug-in housing module is in a plugged-in position at a corresponding plug-in point of the number of plug-in points, the plug-in housing module is brought into contact with electrical connection devices and is detachably fixed to carrier rails of a frame of the switchgear/distribution panel, the plug-in housing module including at least one switching device for switching between a locking position and a release position, and when the at least one switching device is in the release position, the plug-in housing module can be moved out of the plugged-in position into a separation position, where in the separation position, the contact with the electrical connection devices is interrupted, while maintaining a flameproof mechanical connection.

32 Claims, 4 Drawing Sheets

PLUG-IN HOUSING MODULE

The present invention relates to a plug-in housing module for forming an especially explosion-proof switchgear/distribution panel. As a rule, said panel comprises a plurality of plug-in points for such plug-in housing modules. The plug-in housing module contacts electrical connection devices when occupying its plugged-in position and is detachably fixed to carrier rails or the like of a frame of the switchgear/distribution panel in the plugged-in position.

Such switchgears/distribution panels normally comprise standardized wall-mounted or floor-mounted frames in which several plug-in points are arranged. The corresponding plug-in housing modules are normally configured as ignition protection type "pressure-resistant encapsulation" (Ex-d). The corresponding plug-in housing modules automatically contact corresponding electrical connection devices when occupying their plugged-in position at the associated plug-in point. On the whole the plug-in housing modules and the remaining devices form a switchgear/distribution panel of the ignition protection type "increased safety" (Ex-e).

The dimensions of the individual plug-in points can differ for receiving correspondingly differently configured plug-in housing modules.

The materials for plug-in housing modules or also wall- or floor-mounted frames of the system are e.g. plastics, particularly polyamide for the modules, and metal, particularly steel for the corresponding frames.

The modular design provides for a plugging technique without the use of screws, whereby corresponding switchgear/distribution panels can be built up in an inexpensive and clear way according to the modular principle.

The corresponding modules assign corresponding modular dimensions to the respective plug-in point.

Inside the plug-in housing modules, electrical or electronic devices are arranged, such as control devices, control elements, control stations, circuit breakers, or the like.

In a switchgear/distribution panel known from practice with plug-in housing modules the panel must be switched off via a main switch for exchanging a plug-in housing module and the exchange has to be performed by a person with special training as otherwise the demands made on explosion protection would not be satisfied.

It is the object of the present invention to improve a plug-in housing module of the aforementioned type such that, without switching the entire panel off circuit, a plug-in housing module can be inserted into or removed from its corresponding plug-in point even by an untrained person.

According to the invention the plug-in housing module comprises at least one switching device which is accessible from the outside for switching between a locking position and a release position. In locking position the plug-in housing module is fixed in its plugged-in position within the plug-in point. In the release position it can be removed from the plug-in point. However, it can only be removed in release position of the switching device up into a separation position in which the contact with the electrical connection devices is interrupted, while maintaining a flameproof mechanical connection. This means that in separation position the corresponding electrical and electronic components inside the plug-in housing module are voltage-free, and that at the same time owing to the still existing mechanical flameproof connection the demands made on explosion protection are satisfied when the plug-in housing module is moved from the plugged-in position into the separation position.

The separation position is fixed by means of an especially mechanical locking device relative to the plug-in point. It is only after release of said mechanical locking device that the plug-in housing module can be fully removed from the plug-in point.

By analogy the corresponding steps are taken when the plug-in housing module is inserted into its plug-in point. This means that the separation position is first occupied, in which the corresponding mechanical flame-proof connection is already established between plug-in housing module and plug-in point and further insertion in plugged-in position is subsequently performed with simultaneous contacting of the electrical connection device. When the plug-in housing module is fully inserted in plugged-in position, it can be fixed in this position by shifting the switching device into locking position.

The corresponding activities do not require a general switching off of the switchgear/distribution panel and can be carried out by a person having no special training in explosion protection and with respect to the requirements to be heeded in this connection.

To be able to arrange the electrical/electronic components inside the plug-in housing module in a simple, pressure-resistant and flameproof way, the plug-in module may be composed of at least two housing parts in a puncture-proof manner.

To simplify the assembly in this context, the housing parts may comprise edges oriented towards one another, which are interconnected by vibration welding and particularly linear friction welding. Additional measures for connecting the housing parts are not needed.

To switch the corresponding electrical/electronic components off circuit prior to insertion or removal of the plug-in housing module into or out of the plug-in point, the plug-in housing module may comprise a corresponding voltage switching device. In a simplified embodiment the aforementioned switching device is configured as a voltage switching device which in locking position is in on-position and in release position in off-position relative to the voltage supply.

It is in this way that only by operating the switching device the locking or release of the plug-in housing module is accomplished as well as a switching on and off. A simple switching device may be configured such that it has a switching shaft connected to a handle. The switching shaft communicates with corresponding components, such as switches or the like, which cut off or apply voltage. At the same time a corresponding locking element of the switching device can be moved by the switching shaft between end and locking position. In locking position the plug-in housing module is fixed in the plug-in point and in the unlocking position the corresponding locking element is unlocked and the switching device is thus in release position.

One possibility of implementing the locking element is a locking pin which in locking position projects out of the plug-in housing module and is in engagement with a locking accommodation of the plug-in point. The locking pin in unlocking position is thus removed from the locking accommodation and can be retracted up into the plug-in housing module.

To be able to move the locking element in a simple way by means of the switching shaft between locking position and unlocking position, the locking element can be movably supported within a slotted guide at its end oriented towards the switching shaft in a slotted plate that is motion-connected to the switching shaft. With a corresponding movement of the switching shaft the slotted plate moves in a corresponding way, the slotted guide moving the corresponding end of the locking element, thereby shifting it into locking or unlocking position.

In a simple way the slotted guide can comprise a guide slot the distance of which relative to the switching shaft in release position is minimal for occupying the unlocking position. The distance of the guide slot is increasing accordingly when the slotted plate is pivoted with the switching shaft to shift the locking element into locking position.

Other coupling possibilities do also exist, particularly between switching shaft and locking shaft, to move the locking element substantially linearly between locking position and unlocking position by rotating the switching shaft. Another possibility is offered by corresponding cams or the like.

In one embodiment the slotted plate may be arranged substantially in a direction perpendicular to the switching shaft. The corresponding guide slot will then extend in a plane transverse to the switching element; the locking element may here also extend in said plane or parallel to said plane and be in engagement with the guide slot via a correspondingly formed end. A correspondingly formed end may e.g. be an end section bent towards the guide slot, or a guide bolt, or the like, that laterally projects at the free end.

To make sure that the plug-in housing module is movable out of its plugged-in position only up into the separation position without any further manipulations and to enable insertion of the plug-in housing module without any further activities at the same time, the locking device may particularly comprise a snap-in element which automatically locks with a lock accommodating device at the plug-in point upon movement towards plugged-in position. It is ensured on the one hand through the corresponding lock engagement upon movement into plugged-in position that no additional operation is required during insertion of the plug-in housing module, and on the other hand the lock position will only have to be released to withdraw the plug-in housing module via the separation position completely out of the plug-in point.

A simple locking possibility can be seen in that the snap-in element protrudes laterally from the plug-in housing module and is movable along an insertion groove open in a direction opposite to the insertion direction of the plug-in housing module, as a lock accommodating device. With a corresponding insertion the snap-in element is automatically moved into the insertion groove and is in locking engagement therewith. To release the snap-in element from the insertion groove, an additional unlocking operation is needed.

Advantageously, the snap-in element in the plug-in housing module is displaceably supported in deflection direction substantially in a direction transverse to the insertion direction. With the help of such a displaceable support it can follow curvatures or steps of the insertion groove in a simple way at least upon displacement of the plug-in housing module towards plugged-in position while this is suppressed in the opposite direction. An easy possibility for such suppression can be seen in the feature that the snap-in element is spring-loaded in deflection direction. As a result, it is always pressed into deflection direction, so that it can follow the corresponding contour of the insertion groove. Inversely, it must possibly be deflected manually or in another way against spring load to prompt the insertion groove to entirely remove the plug-in housing module from the plug-in point.

In an advantageous embodiment the insertion groove can comprise at least an insertion slope extending obliquely downwards in insertion direction at its open end. With this slope the snap-in element is automatically deflected at the beginning of the insertion operation for the plug-in housing module and is guided towards insertion groove or the open end thereof. This deflection by the insertion slope is advantageously carried out against spring load.

In insertion direction underneath the insertion slope a stop extending substantially in a direction transverse to the insertion direction may be formed. The corresponding spring load on the snap-in element is carried out in deflection direction or in transverse direction relative to the stop. This substantially fixes the separation position in which the snap-in element is positioned underneath the insertion slope on the stop. It is only through a corresponding force action against the spring load that the snap-in element can be moved out of engagement with the stop and is then movable towards the open end of the insertion groove with the plug-in housing module.

Further analogous stops may be formed along the insertion groove to fix different relative positions between plug-in housing module and plug-in point. It is also possible to provide a corresponding stop also upon insertion of the plug-in housing module into the plug-in point, so that it cannot be slid directly and without any further action onto the snap-in element up into the plugged-in position in the plug-in point.

However, in order to ensure a simple movement of the plug-in housing module out of separation position in plugged-in position and inversely, the insertion groove can subsequently extend to the stop substantially in plug-in direction.

To be able to better protect the corresponding housing parts with electrical/electronic components arranged therein and to achieve an increased strength for the plug-in housing module at the same time, the plug-in housing module may comprise a housing frame accommodating the housing parts at least in part. This housing frame can extend particularly along corners and edges of the plug-in housing module in that it is e.g. formed from corresponding interconnected angle sections, or the like.

To be able to handle the plug-in housing module in an easy way, the housing frame may comprise a handle.

It has already been pointed out that the snap-in element for removing the plug-in housing module out of the separation position is deflected, which is made possible in a simple way when the snap-in element comprises a handling end section protruding from the plug-in housing module. This handling end section is connected to the snap-in element in a corresponding way and serves the movement thereof in deflection direction opposite the spring load.

For a simplified operation the handling end section is displaceably supported in a guide slot in the plug-in housing module.

A simple possibility of implementing the electrical connection device can be seen in the feature that said device is formed by electrical plug or mating-plug contacts at the plug-in point, with mating-plug contacts and plug contacts, respectively, being formed by analogy on the plug-in housing module.

The contacts may be surrounded by an edge for protection against damage.

Corresponding plug contacts may be connected in meshing configuration particularly to the connecting bars.

To protect the contacts or to simplify their plugging together, plug and/or mating-plug contacts may be arranged within open contact accommodations that are respectively open to the other contacts.

To permit the mechanical puncture-proof connection in separation position by means of said contact accommodations at the same time, the contact accommodations can be plugged into one another at least in plugged-in position and in separation position and can define a free space between free ends of the separated plug and mating-plug contacts in separation position.

At the same time it is possible to form a flame extinguishing gap between a contact accommodation and the corresponding contact in separation position.

Plug and mating-plug contacts that can be easily plugged together may be configured as plug pins and sockets.

To be able to accurately assign a plug-in point to each plug-in housing module, a guide for the plug-in housing module may be assigned to each plug-in point. Along this guide the plug-in housing module is particularly moved by means of its housing frame to avoid especially damage to the corresponding housing parts.

To move the snap-in element safely in separation position into contact with the stop, the insertion groove in plug-in direction after the insertion slope may comprise a deflection slope inclined in opposite direction relative to the deflection direction. This deflection slope extends in the direction of the spring load, so that the snap-in element moves through the spring load into the insertion groove up to the arrangement underneath the stop, so that without any further aids on the one hand the snap-in element can be automatically guided along the insertion groove and the snap-in element is simultaneously moved in a safe way towards the stop upon movement of the plug-in housing module out of the plugged-in position in separation position.

The invention also encompasses a switchgear/distribution panel with a number of plug-in points for insertion of plug-in housing modules according to the above-described manner.

An advantageous embodiment shall now be explained in more detail with reference to the figures attached in the drawing.

Figure 1:
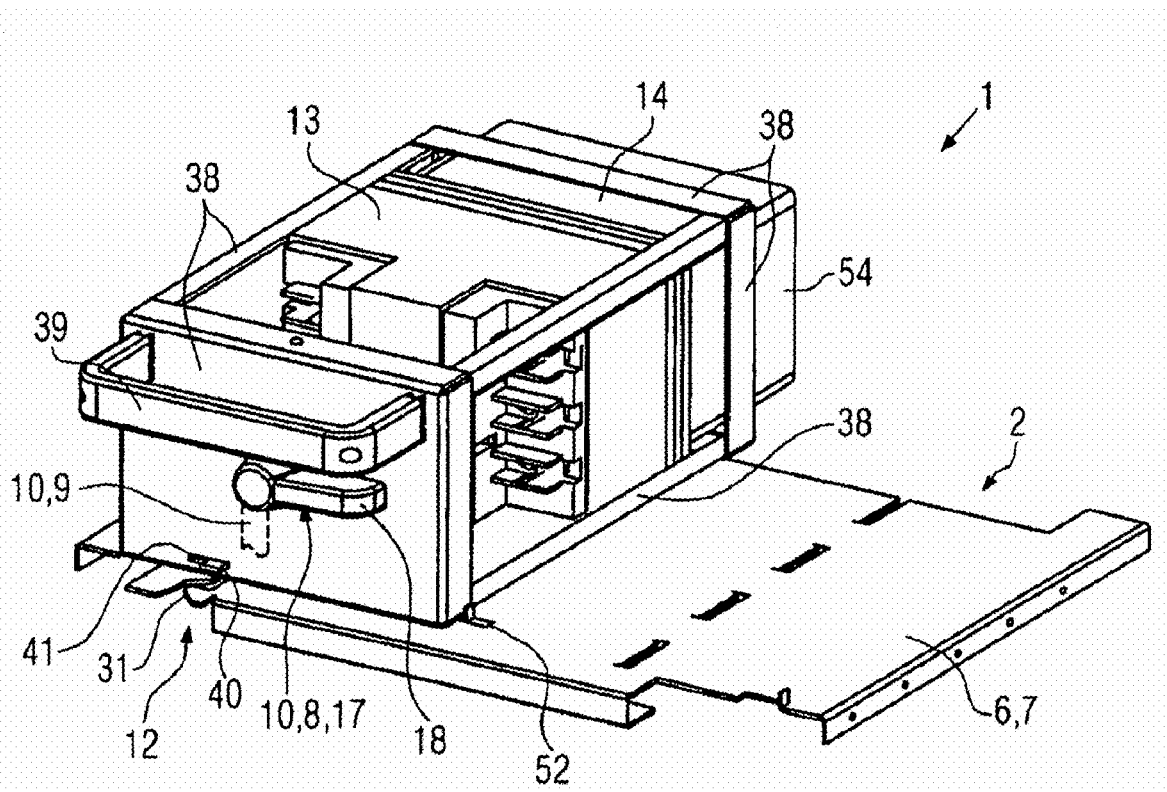
FIG. 1 is a perspective view of a plug-in housing module according to the invention with switchgear/distribution panel illustrated in part.
Figure 5:
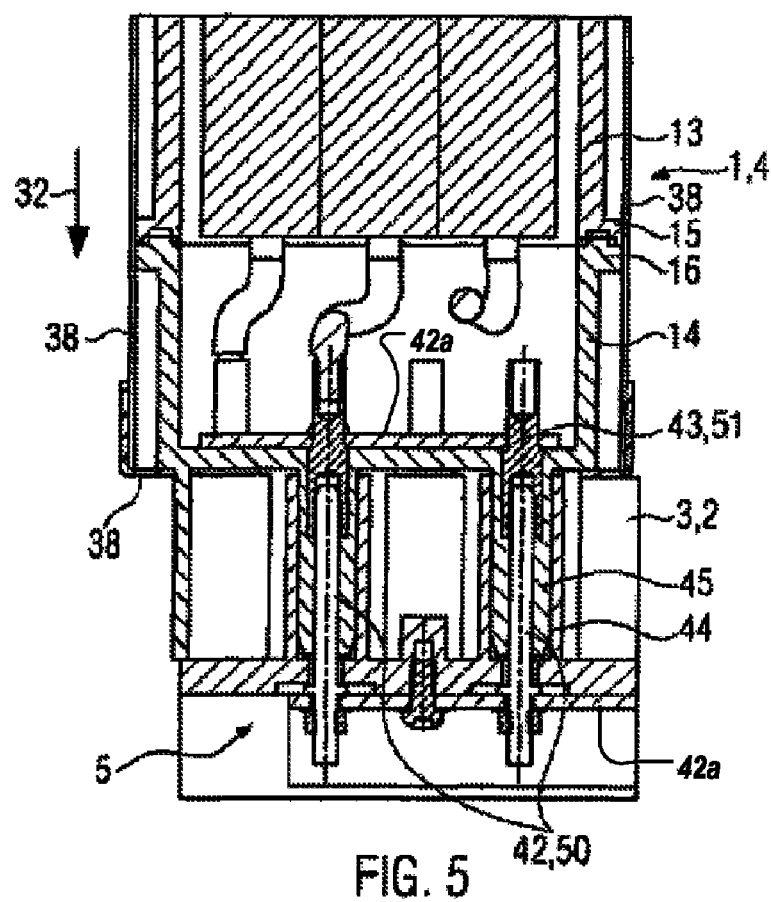
FIG. 5 shows a plugged-in position of a plug-in housing module at the associated plug-in point with contacting of the electrical connection device.
Figure 7:
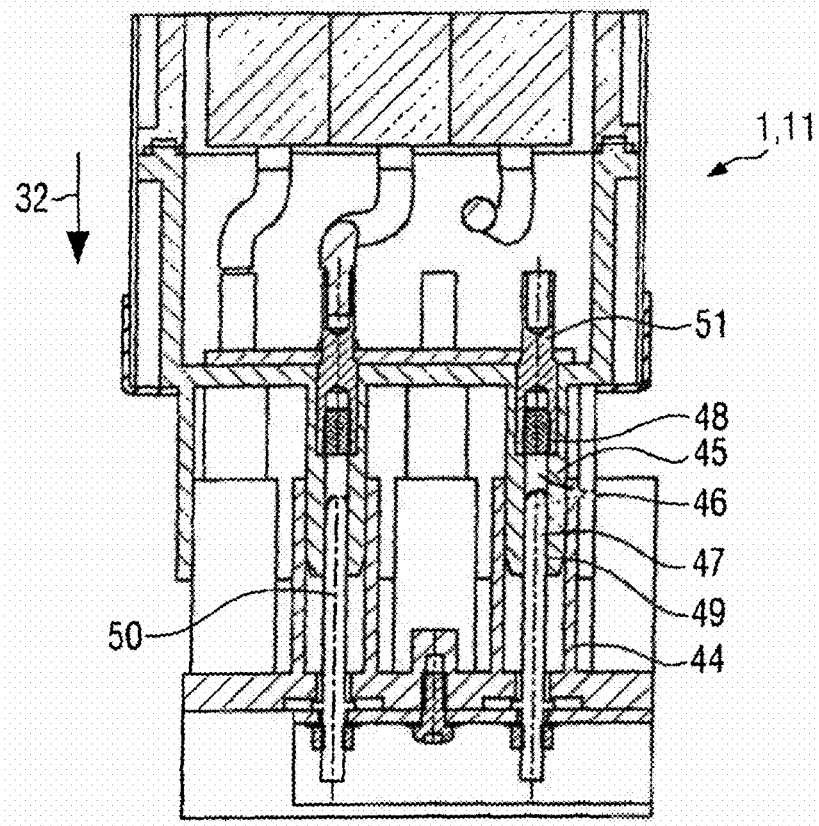
FIG. 7 is a view by analogy with FIG. 5 in separation position of the plug-in housing module.

FIG. 1 is a perspective view of a plug-in housing module 1 according to the invention. Said module is inserted at a plug-in point 3, see also FIGS. 5 and 7, of a switchgear/distribution panel 2. Only part of a corresponding frame 7 in the form of a carrier rail 6 is shown of the switchgear/distribution panel 2. Guides 52 along which the plug-in housing module 1 can be slid up into the plugged-in position 4 in plug-in direction 32, see also FIGS. 5 and 7, are arranged on said carrier rail 6.

In the corresponding plugged-in position 4, contacts of the plug-in housing module 1 contact corresponding electrical connection devices 5 of the plug-in point (see for instance FIG. 5), with the corresponding contacts of the plug-in housing module 1 being surrounded by a lower edge 54. The plug-in housing module 1 comprises a housing frame 38 which is at least formed of a number of sections extending along edges and corners of the plug-in housing module 1. The housing frame 38 has arranged therein two housing parts 13 and 14 that are interconnected in a pressure-resistant and puncture-proof manner along edges 15, 16 facing each other, see also FIG. 5. The corresponding connection of the edges can be established by vibration welding and particularly linear friction welding.

Corresponding electrical and electronic components are arranged inside the housing parts 13, 14. It should additionally be noted that the corresponding housing frame 38 may also comprise side panelling parts, which are not shown for the purpose of simplification in FIG. 1.

A handle 39 which serves the transportation of the plug-in housing module 1 and the insertion in plugged-in position 4 and the removal from the switchgear/distribution panel 2 is arranged on the housing frame 38 at an end of the plug-in housing module 1.

At this end a switching device 10 is further arranged with a handle 18, the corresponding switching device 10 being pivotable by means of the handle 18 between a locking position 9 and a release position 8; see also illustration of the handle 18 in broken line in FIG. 1.

In the illustrated embodiment the corresponding switching device 10 is at the same time a voltage switch 17 which in locking position correspondingly switches on a voltage supply and switches it off in release position.

Figure 4:
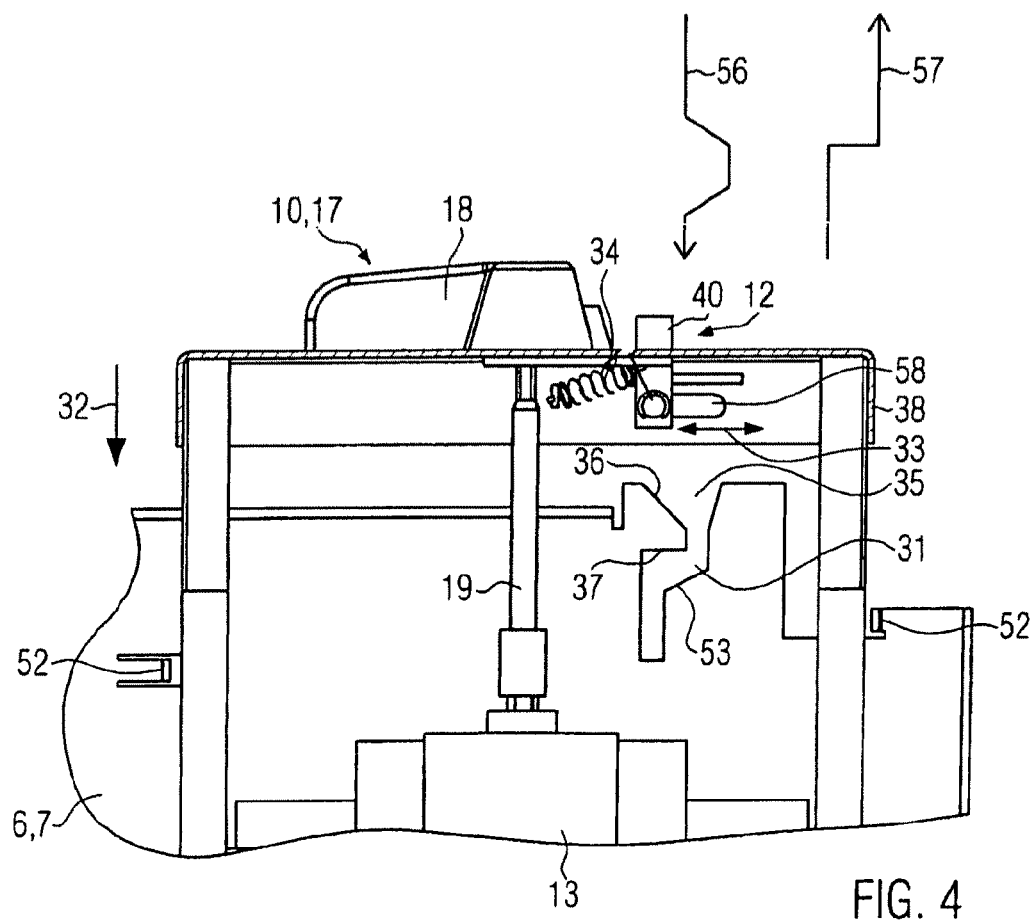
FIG. 4 is a partly cut illustration of a plug-in housing module in the area of its upper end.

Next to the handle 18 a handling end section 40 of a mechanical locking device 12 protrudes from the corresponding end of the plug-in housing module 1, see also FIG. 4. Said handling end section 40 is shiftable along a guide slot 41.

The handling end section 40 is connected to a snap-in element 30 (see once again FIG. 4) which is movable along an insertion groove 31, the corresponding mechanical locking device 12 being formed by insertion groove 31 and the aforementioned elements (snap-in element, handling end section, switching device).

Figure 2:
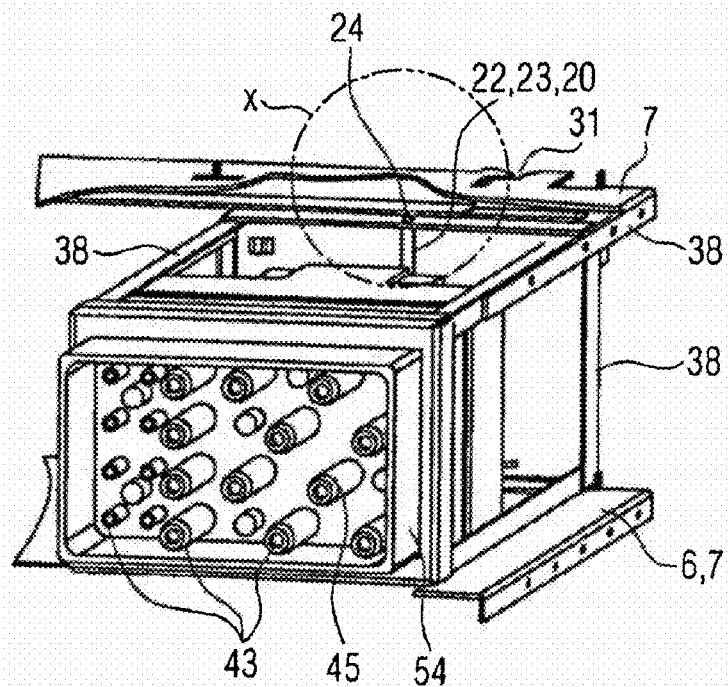
FIG. 2 shows the plug-in housing module according to FIG. 1 in a perspective view from below from the direction of its plug-in point.

FIG. 2 is a perspective view of the end of the plug-in housing module 1 assigned to the plug-in point 3, by analogy with FIG. 1. Like parts identify like features in this figure and in the following figures and are only mentioned in part in connection with a figure.

As can particularly be seen in FIG. 2, a plurality of contacts 43 are arranged in the form of mating-plug contacts inside the edge 54, said contacts being electrically connected, with the plug-in housing module in plugged-in position 4, to corresponding plug contacts 42 of the plug-in point 3.

Underneath the end shown in FIG. 1, a locking element 22 can be seen in the interior of the plug-in housing module 1 as part of the switching device 10, said element extending in a direction transverse to the plug-in housing module 1 in the form of a locking pin 23. Said pin is motion-connected to the switching device 10 and shiftable between a locking position 21, see also FIG. 3, and an unlocking position 20, see FIG. 2. The corresponding locking pin 23 is substantially linearly movable between unlocking and locking position, the pin engaging in locking position 21 into a corresponding locking accommodation 24 of the frame 7 of the switchgear/distribution panel 2. In the illustrated embodiment the locking accommodation 23 is configured as a circular bore. With an arrangement in the locking position 21 the plug-in housing module 1 cannot be removed from the switchgear/distribution panel 2. It is only upon rotation of the switching device 10 in release position 9 that the locking pin 23 moves in unlocking position 20 in a corresponding way, see FIG. 2, so that plug-in housing module 1 can be removed from its plug-in point 3.

The corresponding insertion groove 21 is also arranged in the corresponding frame 7 and in a carrier rail 6, respectively, of the switchgear/distribution panel 2.

Figure 3:
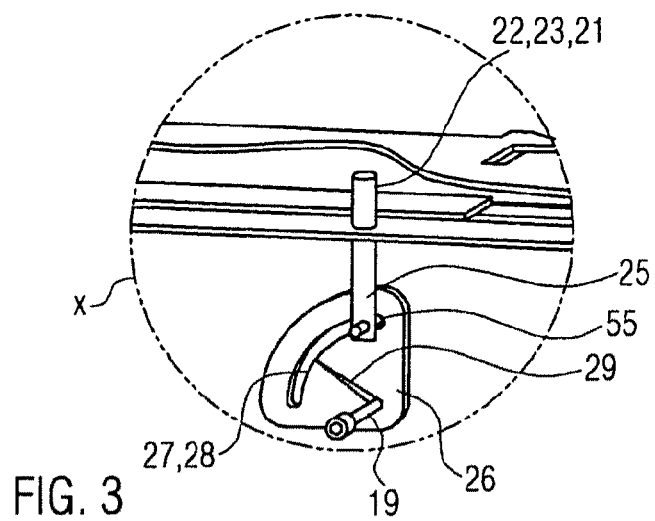
FIG. 3 is an enlarged illustration of detail X of FIG. 2.

FIG. 3 is an enlarged illustration of detail "X" of FIG. 2. What can particularly be seen is the way how the locking pin 23 is connected to a switching shaft 19 at the one end of which the corresponding handle 18 for voltage switch 17 and switching device 10, respectively, is arranged, see also FIG. 4.

The motion connection between locking pin 23 and switching shaft 19 is established via a slotted plate 26, which extends substantially in a direction perpendicular to the switching shaft 19. In this slotted plate 26 a curved slot 28 is configured as a slotted guide 27 for an end 25 of the locking pin 23. At the corresponding end 25 of the locking pin 23 said pin is inserted into the guide slot 28 by means of a guide element 55 protruding in the direction of guide slot 28 and is movably supported there.

The guide slot 28 is arranged in the slotted plate 26 such that a corresponding distance 29 relative to the switching shaft 19 is varied such that it is minimal in unlocking position 20 and maximal in locking position 21. FIG. 3 shows the corresponding locking pin 23 in locking position 21. This means that the distance between guide slot 8 and switching shaft 19 is maximal in said position.

If in FIG. 3 the slotted plate 26 is rotated clockwise by means of the switching shaft 19, the locking pin 23 is moving due to the reduced distance 29 between guide slot 28 and switching shaft 19 in the direction of switching shaft 19 and is withdrawn from the corresponding locking accommodation 24 up into unlocking position 20.

For a complete pivoting of the slotted plate 26 and for shifting the locking pin 23 between locking position 21 and unlocking position 20 a pivot angle of about 90° is needed; see also the two positions of the switching device 10 in FIG. 1.

FIG. 4 shows a partly illustrated longitudinal section through the plug-in housing module 1 according to FIG. 1 or 2. The switching shaft 19 extends inside the plug-in housing module 1 from the handle 18 of the switching device 10 and the voltage switch 17, respectively, up to the housing parts 13, 14, where particularly a voltage supply of the electrical/electronic devices contained in the housing parts can be switched on or off.

The corresponding guides 52, see also FIG. 1, are arranged at both sides relative to the plug-in housing module 1 and serve to guide the plug-in housing module in plug-in direction 32.

In the illustrated position of the plug-in housing module 1 relative to its plug-in point 3, said module is only partially inserted and a contact, for instance, is not established yet with the corresponding electrical connection devices 5 of the plug-in point 3. The corresponding snap-in element 30 as part of the mechanical locking device 12 is also not inserted yet into the insertion groove 31.

The snap-in element 30 protrudes at the side from the handling end section 40 (see also FIG. 1) and is oriented towards the insertion groove 31. The snap-in element 30 is shiftable in a wall of the plug-in housing module 1 along an elongated hole 58 in deflection direction 33. The snap-in element 30 is biased by means of a spring element 34 towards the switching shaft 19 and rests in FIG. 4 on a left end of the elongated hole 58.

The snap-in element 30 is displaceable by means of the handling end section 40 against the pressure load exerted by the spring element 34 along the elongated hole 58.

The insertion groove 31 is arranged inside the carrier rail 6 of the frame 7 of the switchgear/distribution panel 2. The groove has an open end 35 oriented towards the snap-in element 30, into which, upon further insertion of the plug-in housing module 1 in the direction of the plug-in point 3, the snap-in element 30 is introduced.

According to FIG. 4 and the corresponding arrangement of the snap-in element 30 in the elongated hole 58, the snap-in element 30 first impinges on an insertion slope 36 at the open end 35 of the insertion groove 31. This insertion slope 36 is opposite to the spring load in deflection direction 33 and inclined downwards in FIG. 4. The insertion slope 36 serves the automatic deflection of the snap-in element 30 upon impingement on the insertion slope. The deflection is here opposite to the spring load exerted by spring element 34. Subsequently, when the plug-in housing module 1 is further inserted in plug-in direction 32, the snap-in element is further guided along the insertion groove 31 and moves along a deflection slope 53 (inclined in a direction opposite to the insertion slope), this time again substantially into the position according to FIG. 4 relative to the elongated hole 58. Following the deflection slope 53 the insertion groove 31 extends substantially parallel to the switching shaft 19.

A stop 37 which extends substantially in deflection direction 33 is formed between insertion slope 36 and deflection slope 53. When the plug-in housing module 1 is removed from the plug-in point 3, i.e. in a direction opposite to the plug-in direction 32, the snap-in element 30 abuts on the stop 37, see also the direction of the spring load by spring element 34. A separation position 11, see FIG. 7, in which a contacting of the corresponding mating-plug contacts 43 of the plug-in housing module 1 with plug contacts 42 as the electrical connection device 5 of the switchgear/distribution panel 2 is annulled, see once again FIG. 7, is defined by this contact between snap-in element 30 and stop 37.

FIG. 4 shows once again the principle of the movement of the snap-in element 30 by way of arrows 56 and 57, with arrow direction 56 corresponding to an insertion of the plug-in housing module and arrow direction 57 to a removal of the plug-in housing module into or from plug-in point 3.

To move the plug-in housing module 1 further out of the separation position 11 and to remove it completely from the switchgear/distribution panel 2, the snap-in element 30 can be moved by means of the handling end section 40 out of contact with stop 37 in FIG. 4 to the right side, see also arrow direction 57, and is then shifted up to the open end 35 of the insertion groove 31.

FIGS. 5 and 7 show corresponding positions of the plug-in housing module 1, where FIG. 5 corresponds to the plugged-in position 4 and FIG. 7 to the separation position 11. These corresponding positions are shown in FIGS. 6 and 8 once again with reference to insertion groove 31 and snap-in element 30.

As can particularly be seen in FIGS. 5 and 7, the corresponding housing parts are connected by means of their edges 15 and 16 in a pressure-resistant and puncture-proof manner by vibration welding and particularly linear friction welding. As a result, no additional measures are needed for the connection of said housing parts to arrange the corresponding electrical and electronic components in the interior of the housing parts for the necessary explosion protection.

The bottom side of the housing part 14 has arranged thereon the corresponding mating-plug contacts 43 which are connected inside the housing parts 13, 14 to the electrical/electronic components. The mating-plug contacts 43 are substantially configured as sockets 51. These are surrounded in the area of the bottom of the housing part 14 by contact accommodations 45, see also FIG. 2, said contact accommodations having a substantially circular cross-section. The contact accommodations extend up to and beyond free ends 48 of the corresponding mating plug contacts 43 in the direction of plug-in point 3 and plug contacts 42 arranged thereat in the form of plug pins 50. These plug pins 50 are also surrounded by corresponding contact accommodations 44 that extend also up to and beyond the free ends 47 of the plug contacts 42. The contacts may also be of the meshing type and connected to the connecting bars 42a.

In the illustrated plugged-in position 4 according to FIG. 5, plug pins 50 and sockets 51 are in contact with one another, so that an electrical connection is established between plug-in housing module 1 and switchgear/distribution panel 2.

It should once again be noted that other types of contacts are also possible, such as e.g. bar-like plug contacts, particularly connecting bars, the corresponding mating plug contacts being then formed in an analogous way.

Figure 6:
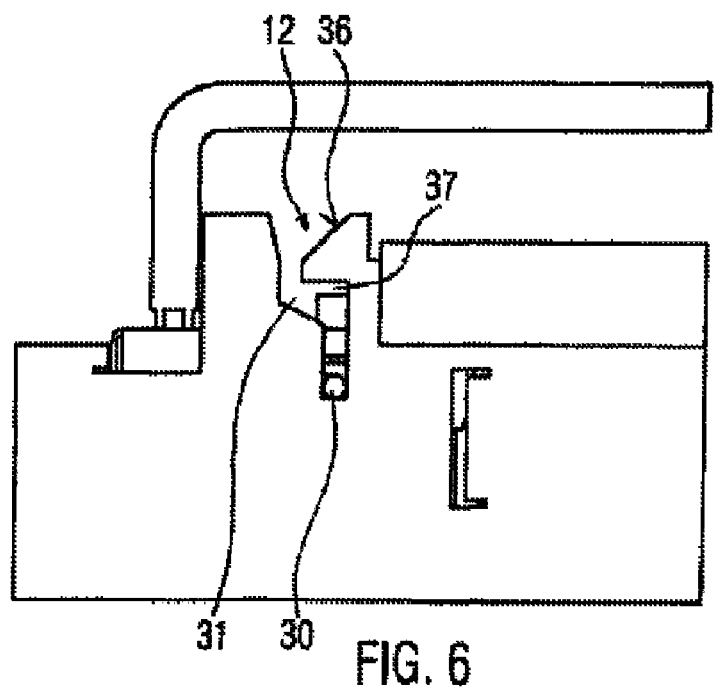
FIG. 6 shows the plug-in housing module in the plugged-in position according to FIG. 5 in the area of a locking device.

According to FIG. 6 in the plugged-in position 4 of the plug-in housing module 1 the snap-in element 30 is shifted up to a lower end of the insertion groove 31 in said groove, see also FIG. 4 with corresponding arrow direction 56. In this position the switching device 10 or the voltage switch 17 is operable and the locking element 22 is shiftable between unlocking position 20 and locking position 21 in a corresponding way. In the locking position 21 of the locking element 22 the voltage supply of the corresponding components of the plug-in housing module 1 is switched on by the voltage switch 17.

If the plug-in housing module 1 is to be removed from the plug-in point 3, the switching device 10 must first be shifted, so that the locking element 22 is shifted in unlocking position 20 and the electrical and electronic components of the plug-in housing module 1 are switched off accordingly with respect to the voltage supply.

Figure 8:
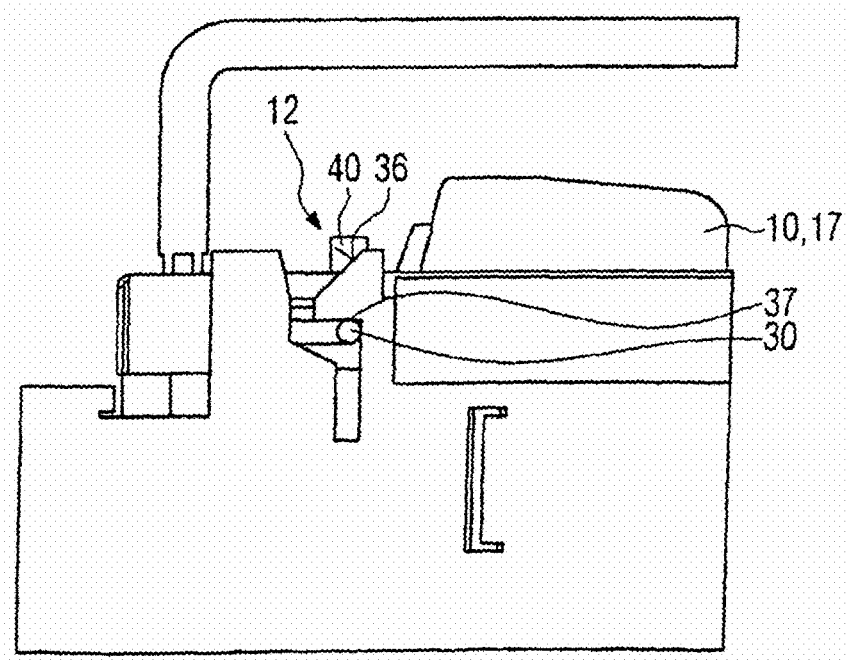
FIG. 8 is an illustration by analogy with FIG. 6 with locking device.

After such switching the plug-in housing module 1 can be removed in a direction opposite to the plug-in direction 32 out of the plug-in point 3, see FIG. 7, until the snap-in element 30 is in contact with stop 37 of the insertion groove 31, see FIG. 8 and FIG. 4 with arrow direction 57. In this separation position 11, the contacts, see FIG. 7, are already separated from one another to such an extent that a free space 46 is formed between their ends 47 and 48. Furthermore, a flame extinguishing gap 49 is formed between contact accommodation 45 and plug pin 5, the gap limiting an ignition of an explosive gas inside the free space 46 upon separation of the contacts according to FIG. 7 to said free space, if necessary, and preventing a discharge of the flame towards plug-in point 3.

It is only when the snap-in element 30 in FIG. 8 is moved to the left side by means of the handling end section 40, see FIGS. 8 and 4, and is no longer in contact with stop 37, that the snap-in element 30 can be moved further along the insertion groove 31 up to its open end 35, and plug-in housing module 1 is thus completely removed from the switchgear/distribution panel 2.

According to the invention it is thus possible to use also different plug-in housing modules in a simple and constructional way in a switchgear/distribution panel 2, wherein the corresponding plug-in housing modules are configured as encapsulated and pressure-resistant housings particularly by means of the connected housing parts. The corresponding plug-in housing modules thereby yield a switchgear/distribution panel with the ignition protection type "increased safety". The corresponding electrical/electronic devices of the plug-in housing module can be formed depending on the requirements, examples of such devices being automatic circuit breakers, protect switches, contactors, relays, power switches, or the like.

With the corresponding safety measures both during insertion and during removal of the plug-in housing module in a direction towards and away from the plug-in point, the corresponding assembly can also be carried out by persons with no special training in explosion protection. The steps particularly during removal of the plug-in housing module 1 must be taken accordingly, and it is here always ensured owing to the sequence of these steps, see operation of the switching device 10 and mechanical locking device 12, that all of the requirements made on explosion protection are satisfied.

The invention claimed is:

1. A plug-in housing module for forming an-explosion-proof switchgear/distribution panel, the plug-in housing module having a plugged-in position, a separation position, and a fully removed position, the switchgear/distribution panel comprising a number of plug-in points, wherein when the plug-in housing module is in the plugged-in position at a corresponding plug-in point of the number of plug-in points, the plug-in housing module is brought into contact with electrical connection devices and is detachably fixed to carrier rails of a frame of the switchgear/distribution panel, the plug-in housing module comprising at least one switching device accessible from the outside for switching between a switching device locking position and a switching device release position, the at least one switching device comprising a switching shaft connected to a switching handle by a locking element that is movable between a locking element locking position and a locking element unlocking position, and when the at least one switching device is in the switching device release position, the plug-in housing module can be moved out of the plugged-in position into the separation position, wherein in the separation position, the contact with the electrical connection devices is interrupted, while maintaining a flameproof mechanical connection, and the separation position is determined in relation to the corresponding plug-in point by a mechanical locking device, wherein once the mechanical locking device has been released, the plug-in housing module can be fully removed from the corresponding plug-in point.

2. The plug-in housing module of claim 1, wherein the plug-in housing module is composed of at least two housing parts in a flameproof manner.

3. The plug-in housing module of claim 2, wherein the at least two housing parts have edges oriented towards each other, which are interconnected by vibration welding.

4. The plug-in housing module of claim 3, wherein vibration welding comprises linear friction welding.

5. The plug-in housing module of claim 2, wherein the plug-in housing module comprises a housing frame that accommodates the at least two housing parts.

6. The plug-in housing module of claim 1, wherein the at least one switching device comprises a voltage switch which in the switching device locking position is arranged in an on-position and in the switching device release position is arranged in an off-position.

7. The plug-in housing module of claim 1, wherein the locking element comprises a locking pin which in the locking element locking position protrudes from the plug-in housing module and is in engagement with a locking accommodation of the corresponding plug-in point.

8. The plug-in housing module of claim 1, wherein the locking element is movably supported within a slotted guide at an end of the locking element oriented towards the switching shaft in a slotted plate that is motion-connected to the switching shaft.

9. The plug-in housing module of claim 8, wherein the slotted guide comprises a guide slot a distance of which relative to the switching shaft is minimal in the switching device release position for arranging the locking element in the locking element unlocking position.

10. The plug-in housing module of claim 8, wherein the slotted plate is arranged substantially perpendicular to the switching shaft.

11. The plug-in housing module of claim 1, wherein the locking device comprises a snap-in element which automatically locks with a lock accommodating device at the corresponding plug-in point during insertion of the plug-in housing module in the plugged-in position.

12. The plug-in housing module of claim 11, wherein the snap-in element protrudes laterally from the plug-in housing module and is movable along an insertion groove that is open in a direction opposite to a plug-in direction of the plug-in housing module, as the lock accommodating device.

13. The plug-in housing module of claim 12, wherein the insertion groove comprises an open end, the open end comprising an insertion slope extending obliquely downwards in the plug-in direction.

14. The plug-in housing module of claim 13, wherein a stop extending substantially in a deflection direction is formed in the plug-in direction underneath the insertion slope, with a spring loading of the snap-in element being exerted in a direction towards the stop.

15. The plug-in housing module of claim 14, wherein the insertion groove extends after the stop substantially in the plug-in direction.

16. The plug-in housing module of claim 13, wherein in the plug-in direction following the insertion slop; the insertion groove comprises a deflection slope inclined in an opposite direction relative to a deflection direction.

17. The plug-in housing module of claim 13, wherein the insertion groove comprises a deflection slope inclined in an opposite direction relative to the insertion slope.

18. The plug-in housing module of claim 11, wherein the snap-in element in the plug-in housing module is displaceably supported in a deflection direction substantially in a direction transverse to a plug-in direction.

19. The plug-in housing module of claim 11, wherein the snap-in element is spring-loaded in a deflection direction.

20. The plug-in housing module of claim 1, wherein the plug-in housing module comprises a housing frame accommodating housing parts at least in part.

21. The plug-in housing module of claim 20, wherein the housing frame comprises a module handle for displacing the plug-in housing module in a plug-in direction.

22. The plug-in housing module of claim 1, further comprising a snap-in element comprising a handling end section protruding from the plug-in housing module.

23. The plug-in housing module of claim 22, wherein the handling end section is displaceably supported in a guide slot of the plug-in housing module.

24. The plug-in housing module of claim 1, wherein the electrical connection devices are formed by one of electrical plug contacts or mating-plug contacts, and another of the mating-plug contacts or the electrical plug contacts are correspondingly arranged on the plug-in housing module.

25. The plug-in housing module of claim 24, wherein the electrical plug contacts and the mating-plug contacts are surrounded by an edge.

26. The plug-in housing module of claim 24, wherein the electrical plug contacts of the electrical connection devices are of a meshing type connected to connecting bars.

27. The plug-in housing module of claim 24, wherein the one of the electrical plug contacts or the mating-plug contacts are arranged inside open contact accommodations that are respectively open to the another of the electrical plug contacts or the mating-plug contacts.

28. The plug-in housing module of claim 27, wherein when in the plugged-in position and in the separation position, a first portion of the contact accommodations is plugged into a second portion of the contact accommodations and when in the separation position, a free space is defined between free ends of the electrical plug contacts and the mating-plug contacts.

29. The plug-in housing module of claim 28, wherein when in the separation position, a flame extinguishing gap is formed between at least one of the contact accommodations and a corresponding electrical plug of the electrical plug contacts or a corresponding mating plug contact of the mating-plug contacts.

30. The plug-in housing module of claim 24, wherein the electrical plug contacts and the mating-plug contacts are configured as plug pins and sockets, respectively.

31. The plug-in housing module of claim 1, wherein guides for the plug-in housing module are assigned to the corresponding plug-in point for a displacement in a plug-in direction.

32. A switchgear/distribution panel comprising a number of plug-in points and electrical connection devices assigned thereto, wherein a plug-in housing module according to claim 1 can be inserted in each plug-in point of the number of plug-in points.

* * * * *

UNITED STATES PATENT AND TRADEMARK OFFICE
CERTIFICATE OF CORRECTION

| | | |
|---|---|---|
| PATENT NO. | : 8,085,527 B2 | |
| APPLICATION NO. | : 12/513982 | |
| DATED | : December 27, 2011 | |
| INVENTOR(S) | : Reiner Naumann | |

It is certified that error appears in the above-identified patent and that said Letters Patent is hereby corrected as shown below:

IN THE CLAIMS:

Column 10, line 9 (approximately), claim 1, delete "an-explosion-proof" and insert --an explosion-proof--, therefor.

Column 11, line 26 (approximately), claim 16, delete "slop," and insert --slope,--, therefor.

Signed and Sealed this
Sixth Day of March, 2012

David J. Kappos
*Director of the United States Patent and Trademark Office*